United States Patent [19]
Rhodes et al.

[11] Patent Number: 5,687,978
[45] Date of Patent: Nov. 18, 1997

[54] FOLDABLE LOAD CONVEYANCE APPARATUS

[76] Inventors: Ivan W. Rhodes, 2055 Sussex La., Colorado Springs, Colo. 80909; Vito Giorgio, Jr., 1655 Fawnwood, Monument, Colo. 80132

[21] Appl. No.: 531,847

[22] Filed: Sep. 21, 1995

[51] Int. Cl.[6] ........................... B62B 1/04
[52] U.S. Cl. ............... 280/30; 280/652; 280/655; 280/47.3; 280/47.32
[58] Field of Search ............... 280/652, 30, 655, 280/659, 43.1, 47.2, 47.21, 47.3, 47.315, 47.32, 78, 656, 35, 47.31, 47.18

[56] References Cited

U.S. PATENT DOCUMENTS

| | | | |
|---|---|---|---|
| 2,416,492 | 2/1947 | Neeley | 280/652 |
| 2,918,296 | 12/1959 | Goodale | 280/645 |
| 3,456,959 | 7/1969 | Hemphill et al. | 280/47.3 |
| 3,560,015 | 2/1971 | Tracy | 280/47.3 |
| 4,215,877 | 8/1980 | Pritchett | 280/652 |
| 4,703,944 | 11/1987 | Higson | 280/30 |
| 4,740,008 | 4/1988 | Johnson | 280/47.18 |
| 5,201,536 | 4/1993 | Bono et al. | 280/30 |

FOREIGN PATENT DOCUMENTS

| | | | |
|---|---|---|---|
| 0874251 | 5/1950 | Germany | 280/30 |
| 0402364 | 2/1941 | Italy | 280/30 |
| 0004968 | 2/1913 | United Kingdom | 280/78 |

Primary Examiner—Anne Marie Boehler
Attorney, Agent, or Firm—Phillip A. Rein

[57] ABSTRACT

A foldable load conveyance apparatus including 1) a basic support frame assembly; 2) a pair of handle support assemblies pivotally connected to outer opposite ends of the basic support frame assembly; and 3) a collapsible support wheel assembly releasably connected to the basic support frame assembly. Each handle support assembly has a handle grip tube section with a connector member for releasable connection to an ATV. The collapsible support wheel assembly includes a pair of wheel support struts pivotally connected to the basic support frame assembly and operable to receive and support a support wheel assembly therebetween. The foldable load conveyance apparatus is operable to be collapsed into a compact condition for ease of conveyance, transporting in a vehicle, and storage; and selectively movable to a support table condition for multiple uses.

9 Claims, 4 Drawing Sheets

FOLDABLE LOAD CONVEYANCE APPARATUS

PRIOR ART

A prior art patent search was not conducted on this invention.

PREFERRED EMBODIMENT OF THE INVENTION

In one preferred embodiment of this invention, a foldable load conveyance apparatus is operated by a user primarily directed to the area of removing an elk or deer carcass or the like from a remote location such as hunting in rugged terrain in the mountains. The foldable load conveyance apparatus is foldble into a table condition or mode to present a working surface used to support a carcass thereon to dress for subsequent cooking and consumption. The foldable load conveyance apparatus is completely collapsible and foldable into a compact condition for ease of conveyance in a pickup truck or other similar transporting vehicle.

The foldable load conveyance apparatus includes 1) a basic support frame assembly; 2) a handle support assembly pivotally connected to the basic support frame assembly; and 3) a collapsible support wheel assembly which is connected to the basic support frame assembly to provide means of support and easy movement on rugged terrain.

The basic support frame assembly includes outer parallel side support members interconnected by spaced parallel end support members all interconnected by a main load support plate. Each outer end of the side support members has adjacent, spaced, cooperating parallel handle connector plates to be connected to portions of the handle support assembly as will be explained.

Each side support member having spaced, adjacent, parallel side walls with aligned handle anchor holes is used to secure the handle support assembly selectively in 1) a collapsed storage/transport condition; 2) an extended, elevated table condition; and 3) a load conveyance condition for movement over rough terrain.

The main load support plate is provided with an outer peripheral edge secured as by welding to the side support members and the end support members. The main load support plate includes reinforcement openings and an indentation section to increase overall strength thereof.

The outer side support members are provided with connector link or tube members operable to receive and support a portion of the collapsible support wheel assembly.

The handle support assembly may be provided at each opposite ends of the basic support frame assembly so that two users thereof can aid in moving the foldable load conveyance apparatus when loaded with a carcass which may be of substantial weight.

Each handle support assembly includes spaced support arm assemblies interconnected by a transverse strut member and selectively connected by connector link members to the basic support frame assembly. Each support arm assembly is identical and having 1) a frame connector section operable to be pivotally connected to the handle connector plates of the basic support frame assembly; 2) a mid support tube section having one end integral with an outer portion of the frame connector section; and 3) a handle grip tube section integral with an outer end of the mid support tube section.

Each frame connector section includes a pair of aligned frame connector holes and a connector member to be mounted within the aligned frame connector holes and connector holes in respective ones of the handle connector plates.

Each mid support tube section is provided with aligned link connector holes operable to receive a connector member used to connect one end of a respective connector link member thereagainst.

An upper, outer end portion of each handle grip tube section is provided with an outer end portion and an ATV connector member operable for securing to a portion of an All Terrain Vehicle (ATV) to assist the user on moving the foldable load conveyance apparatus with a carcass thereon to an area that is accessible by vehicles for further transporting of the subject carcass.

The collapsible support wheel assembly includes a pair of identical wheel support assemblies operable to be pivotally connected to the basic support frame assembly; a support wheel assembly connected to the wheel support assemblies; and a wheel support and protector assembly selectively connected between the basic support frame assembly and the support wheel assembly.

Each wheel support assembly includes a wheel support strut of generally V-shape having outer ends pivotally connected to respective ones of strut connector members to the basic support frame assembly and a wheel support bracket pivotally connected to each wheel support strut.

Each wheel support strut includes 1) a mid wheel support section integral on each outer end thereof with an inclined support section which, in turn, is integral with outer pivot connector sections; and 2) the strut connector members or tubes are secured as by welding to spaced undersurfaces of the side support members.

Each wheel support bracket includes a support tube section integral with a wheel support section provided with an axle support hole to receive one end portion of a wheel axle member therethrough as will be explained. The support tube section is provided with a central hole to receive the mid wheel support section of the wheel support strut therein.

The support wheel assembly includes a tire and spoke member having a tire member connected to spoke members and supported on a central hub section.

The wheel support and protector assembly includes a U-shaped wheel support member releasably connected to the basic support frame assembly and a wheel axle member connected to the wheel support member and the wheel support brackets on the wheel support assembly.

More particularly, the U-shaped wheel support member includes a top connector section integral with spaced, parallel wheel connector sections. The top connector section is releasably connected to the basic support frame assembly through a lug member in a usage condition and disconnected therefrom when in a collapsed storage or transport condition.

The wheel connector sections are operable to receive and support the wheel axle member having the central hub section of the tire and spoke member rotatably mounted thereon.

OBJECTS OF THE INVENTION

One object of this invention is to provide a foldable load conveyance apparatus operable to be collapsed into a compact conveyance condition and operable to be readily reassembled for use in one position as a support table to dress a carcass and used in another position for transversing rugged terrain with a large load thereon such as a bear, deer, or elk carcass.

Another object of this invention is to provide a foldable load conveyance apparatus having 1) a basic support frame assembly of a sufficient size to convey a large carcass thereon; 2) a support handle assembly pivotally connected to one or both outer ends of the basic support frame assembly so as to be utilized by one or two users thereof; and 3) a collapsible support wheel assembly releasably connected to the basic support frame assembly in a transport condition for ease of movement across rugged terrain as found in hunting situations.

One other object of this invention is to provide a foldable load conveyance apparatus having outer handle support assemblies provided with an ATV connector member so as to be readily attached to present support structures on All Terrain Vehicles (ATV) and connected for ease of movement out of a rugged terrain hunting area with a heavy load carcass mounted thereon.

One other object of this invention is to provide a foldable load conveyance apparatus with a basic support frame assembly connected to outer handle support assemblies and contacting a ground support surface with a collapsible support wheel assembly being of a single tire support wheel member for ease of movement in narrow trails while providing substantial stability.

Another object of this invention is to provide a foldable load conveyance apparatus having a low center of gravity to add substantial stability during movement over rugged terrain and narrow trails which are normally found in mountain hunting areas.

One further object of this invention is to provide a foldable load conveyance apparatus including handle support assemblies pivotally connected to opposite ends of a basic support frame assembly whereby the handle support assemblies are selectively movable from 1) operating as support legs for the basic support frame assembly with multiple uses such as acting as a support table used to dress a carcass thereon; and 2) operating as support and steering for the basic support frame assembly acting as a support and transport cart to remove a carcass from a remote hunting location.

Still, one other object of this invention is to provide a foldable load conveyance apparatus which is easily assembled and disassembled with a minimum amount of time and effort; sturdy in construction so as to carry a heavy carcass thereon while dressing the carcass or transporting the carcass; provided with a handle support assembly having parallel handle grip tube sections spaced a considerable distance so as to give the user stability and control during movement; economical to manufacture; and substantially maintenance free.

Various other objects, advantages, and features of the invention will become apparent to those skilled in the art from the following discussion, taken in conjunction with the accompanying drawings, in which:

FIGURES OF THE INVENTION

The following is a discussion and description of preferred specific embodiments of the foldable load conveyance apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Figures 1, 3, 4, 5:
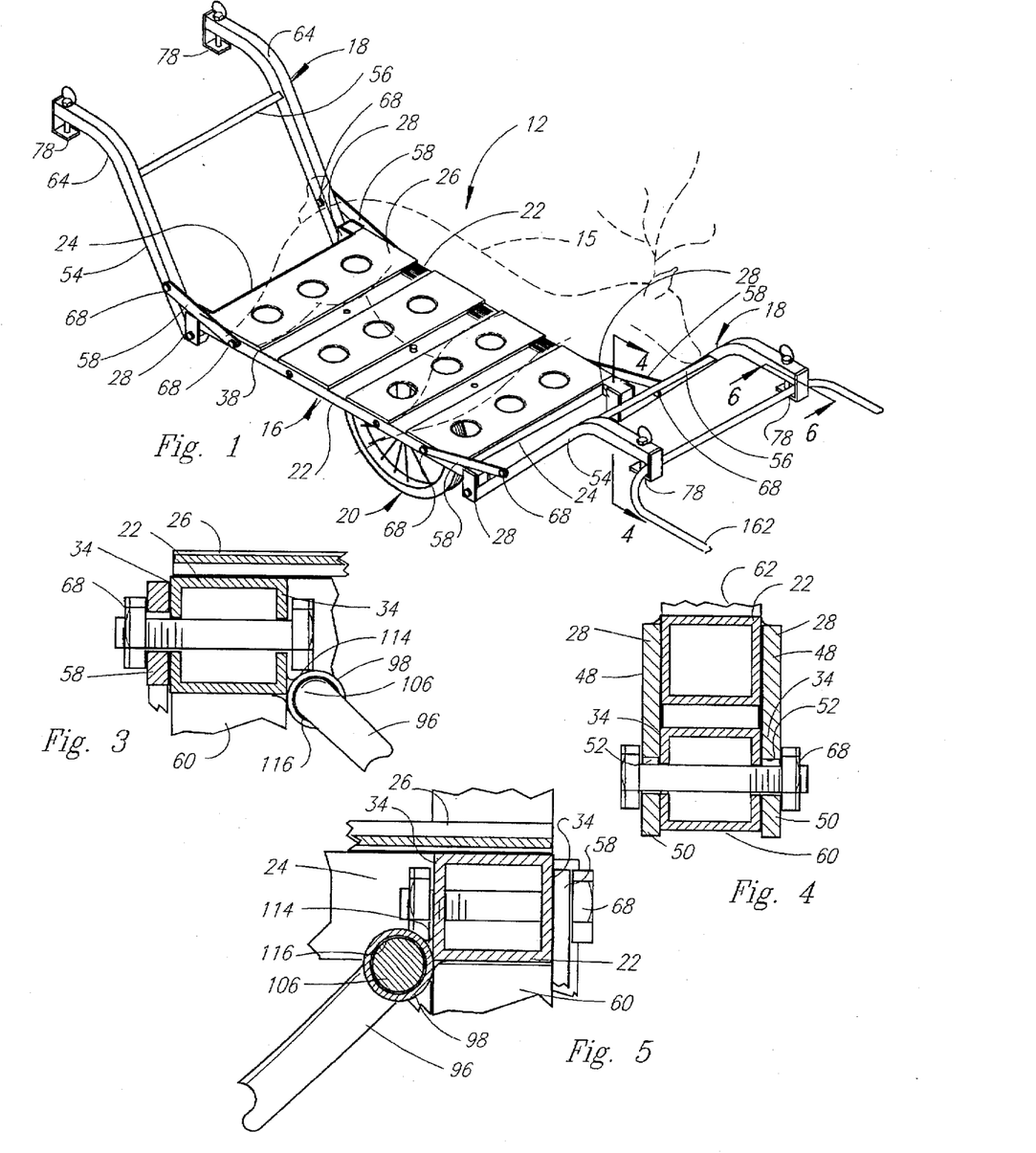
FIG. 1 is a perspective view of a foldable load conveyance apparatus of this invention in an assembled condition.
FIG. 3 is an enlarged fragmentary sectional view taken along line 3—3 in FIG. 2.
FIG. 4 is an enlarged fragmentary sectional view taken along line 4—4 in FIG. 1.
FIG. 5 is an enlarged fragmentary sectional view taken along line 5—5 in FIG. 2.

On referring to the drawings in detail, and in particular to FIG. 1, a foldable load conveyance apparatus of this invention, indicated generally at 12, is operable to be 1) collapsed or folded into a compact condition for ease of storage and transporting in a vehicle; 2) foldable to a usage condition similar to a four-legged support table assembly with many uses including to support a carcass thereon in order to dress same; and 3) utilized by a user, normally a hunter or camper, to carry a load, such as an animal carcass 15, from a rugged terrain after a hunting expedition.

The foldable load conveyance apparatus 12 includes 1) a basic support frame assembly 16 operable to support the animal carcass 15 thereon; 2) a pair of handle support assemblies 18 pivotally connected to respective outer ends of the basic support frame assembly 16; and 3) a collapsible support wheel assembly 20 pivotally connected to the basic support frame assembly 16.

The basic support frame assembly 16 preferably includes a support frame constructed of a square tubular material and having a load support plate theeon to receive and support the animal carcass 15 or other items thereon.

More particularly, the basic support frame assembly 16 includes 1) parallel spaced, outer side support or tube members 22; 2) spaced parallel outer end support or tube members 24 interconnected to spaced, outer ends of the outer side support members 22; 3) a main load support plate 26 secured as by welding to upper surfaces of the side support members 22 and end support members 24; and 4) a pair of spaced, adjacent, parallel handle connector plates or lugs 28 secured as by welding to respective outer ends of the side support members 22.

Each outer side support member 22 is provided with spaced, parallel opposed side wall surfaces 34 each having aligned handle connector openings or holes 30 and collapsed handle anchor openings or holes 32 for reasons to be explained.

The end support members 24 are provided with top surfaces 36 to have the main load support plate 26 welded thereto.

The main load support plate 26 includes 1) outer peripheral support edges 38; 2) a plurality of spaced, namely four, support sections 40; and 3) indentation sections 42 placed between spaced ones of the support sections 40.

The peripheral support edges 38 are secured as by welding to adjacent upper surfaces of the side support members 22 and the end support members 24.

The support sections 40 are each provided with a plurality, namely three, flared, indented reinforcement openings 44 operable to add strength in conjunction with the indentation sections 42.

The indentation sections 42 are each provided with a central connector hole 46 individually operable to releasably connect the collapsible support wheel assembly 20 thereto as will be explained.

As best shown in FIG. 4, the handle connector plates or lugs 28 are each provided with an anchor section 48 integral with a connector section 50 having an aligned connector hole 52 therein. Each anchor section 48 is secured as by welding to spaced, adjacent side wall surfaces 34 of respective outer ends of the side support members 22.

The aligned connector holes 52 are used to have outer end sections of a portion of the handle support assembly 18 pivotally connected thereto in a manner to be explained.

Figure 8:
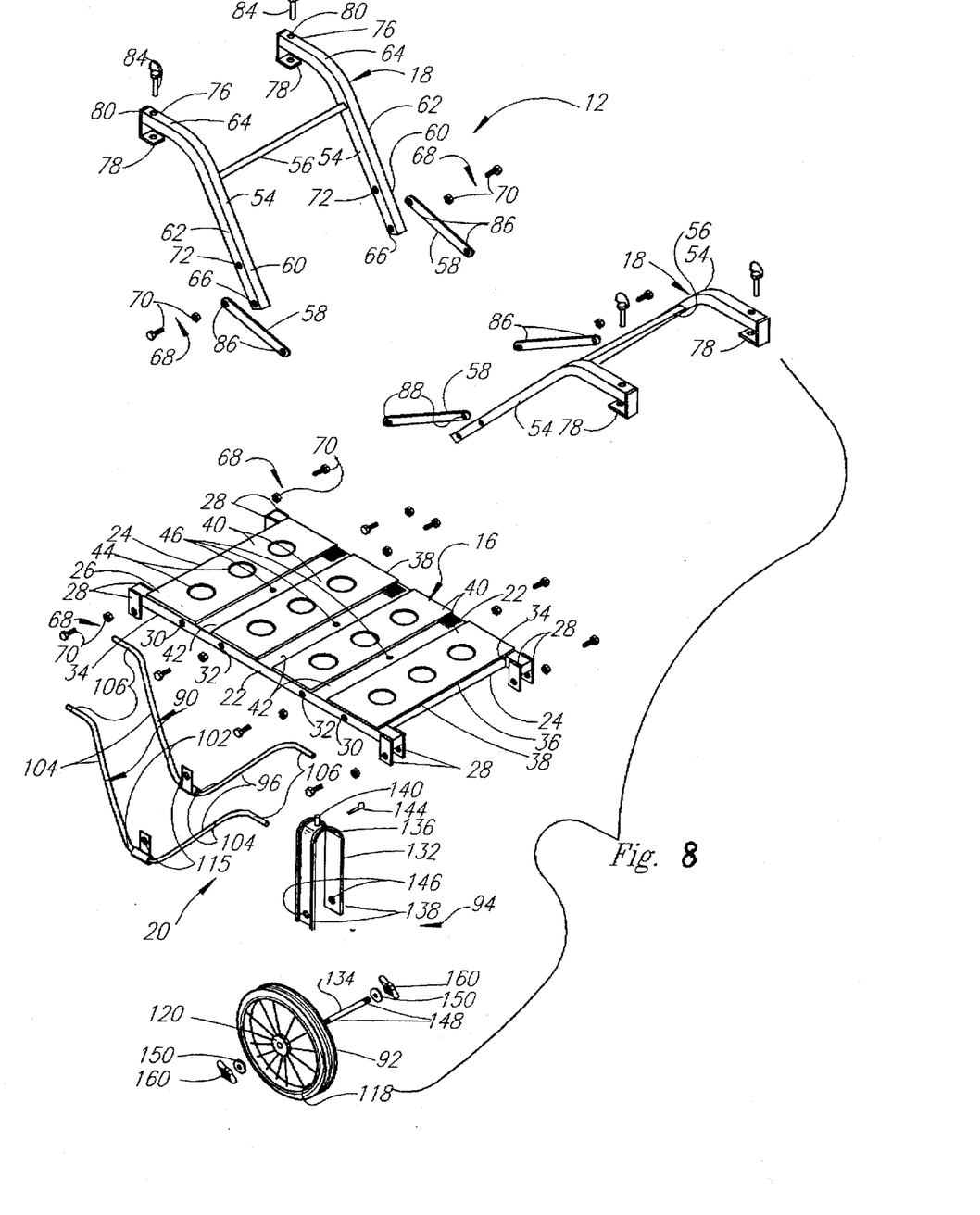
FIG. 8 is an exploded perspective view of the foldable load conveyance apparatus of this invention.

As noted in FIG. 8, each of the handle support assemblies 18 are provided with a pair of spaced support arm assemblies 54 which are interconnected by a transverse strut member 56 and, at outer ends, to the basic support frame assembly 16 by connector link members 58.

Each spaced support arm assembly 54 is provided with 1) a frame connector section 60 operable to be pivotally connected to respective adjacent outer connector sections 50 of the handle connector plates 28; 2) a mid support tube section 62 having one end integral with an outer end portion of the frame connector section 60; and 3) a handle grip tube section 64 integral with an outer end of the mid support tube section 62.

As shown in FIG. 8, the frame connector section 60 has a pair of aligned frame connector holes 66 operable to receive a connector member 68 being a nut and bolt member 70 therethrough and trained through the aligned connector holes 52 in the handle connector plates 28. The connector members 68 achieve a pivotal connection between the support arm assemblies 54 and the basic support frame assembly 16.

Figures 6, 7:
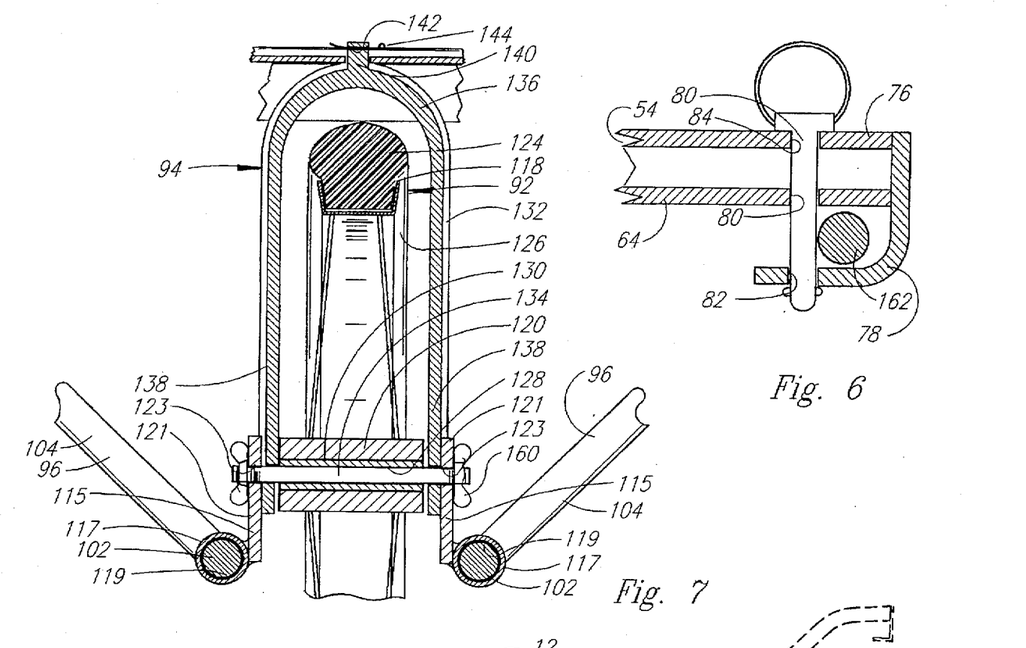
FIG. 6 is an enlarged fragmentary sectional view taken along line 6—6 in FIG. 1.
FIG. 7 is an enlarged fragmentary sectional view taken along line 7—7 in FIG. 2.

The connector member 68 can be other than a nut and bolt member 70 such as a lock pin member with detents and a pull ring as shown in FIG. 6 or a linch pin. The linch pin is placed through a hole in an outer end of a bolt member to restrict axial movement of the bolt member. The linch pin can be a spring biased ring member.

Each mid support tube section 62 is provided with aligned link connector holes 72 operable to receive a connector member 68 being a nut and bolt member 70 therethrough. The connector member 68 allows pivotal connection of a respective connector link member 58 to a respective support arm assembly 54 for reasons to be explained.

The handle grip tube sections 64 are of an arcuate shape so that outer portions thereof are in a generally horizontal plane parallel to an upper surface of the basic support frame assembly 16 when in the assembled and load conveyance condition of FIG. 1.

As noted in FIG. 6, each of the handle grip tube sections 64 have an outer end portion 76 having an All Terrain Vehicle (ATV) connector member 78 secured thereto. Each outer end portion 76 is provided with vertically aligned connector holes 80 to receive an anchor pin member 84 therethrough.

The ATV connector member 78 is of an L-shaped plate construction and extended below a lower surface of an adjacent outer end portion 76 so as to be releasably attached to a support member on the ATV. A releasable connection to the ATV is achieved by the anchor pin member 84 extended through the anchor hole 82 in the ATV connector member 78 and the connector holes 80 in the respective outer end portion 76 in a method of use as will be explained.

Each connector link member 58 is of an elongated rectangular plate material having outer connector end sections 86, each having a connector hole 88 therein for reasons to be explained.

As best shown in FIG. 8, the collapsible support wheel assembly 20 includes a pair of cooperating wheel support assemblies 90 operable to receive and rotatably support a support wheel assembly 92 thereon and having a wheel support and protector assembly 94 normally mounted between the basic support frame assembly 16 and the support wheel assembly 92.

Each wheel support assembly 90 includes a wheel support strut 96 of generally V-shape which is pivotally connected to the strut connector members or tubes 98 which are secured to the basic support frame assembly 16 and having a wheel support bracket 115 pivotally connected to a portion of the wheel support strut 96.

More particularly, each wheel support strut 96 includes a mid wheel support section 102 integral at respective outer ends with inclined support sections 104 which, in turn, are integral with outer pivot connector sections 106.

The mid wheel support section 102 has one of the wheel support brackets 115 pivotally connected thereto. Each wheel support bracket 115 includes a support tube section 117 integral with a wheel support section 121 as shown in FIG. 7. The support tube section 117 has a central hole 119 having the mid wheel support section 102 pivotally mounted therein.

The respective outer pivot connector sections 106 are pivotally mounted in a central opening or hole 116 in one of the strut connector members 98. An outer connector surface 114 of each of the strut connector members 98 is secured as by welding to respective adjacent inner surfaces of the side support members 22 (FIGS. 3 and 5).

Each wheel support section 121 has an axle support hole 123 to receive and support a wheel axle portion of the wheel support and protector assembly 94 therein as will be described.

The support wheel assembly 92 resembles a bicycle type wheel assembly having a tire and spoke member 118 rotatably mounted on a wheel axle member 134. The tire and spoke member 118 has a central hub section 120 provided with a transverse axle support hole 128 and a bearing member 130 so as to be freely rotatable about the wheel axle member 134. The tire and spoke member 118 further includes a tire member 124 connected by spoke members 126 to the central hub section 120.

As shown in FIG. 7, the wheel support and protector assembly 94 includes 1) a U-shaped wheel support member 132; and 2) the wheel axle member 134 is interconnected to the wheel support member 132 and the spaced, adjacent wheel support brackets 115.

The wheel support member 132 includes a top connector section 136 integral with spaced, parallel wheel connector sections 138. The top connector section 136 includes an upwardly extended lug member 140 provided with a connector hole 142 to receive a cotter pin member 144 therethrough in a manner to be explained.

Each wheel connector section 138 is provided with an axle support hole 146 aligned with each other and operable to receive and support the wheel axle member 134 therein.

The wheel axle member 134 has outer threaded end sections 148 to receive connector members 150 thereon, preferably being wing nut members 160.

Use and Operation of the Invention

Figure 9:
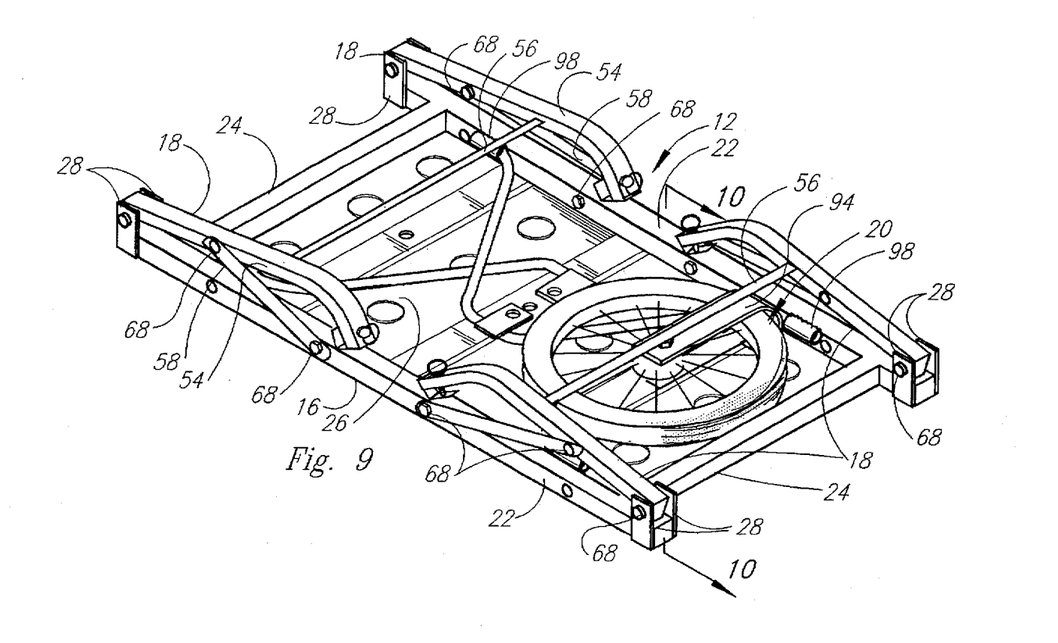
FIG. 9 is a perspective view of the foldable load conveyance apparatus in a collapsed storage/transport condition.

In the use and operation of the foldable load conveyance apparatus 12, refer to the folded or collapsed condition as shown in FIG. 9. This collapsed condition is desirable for 1) ease of conveyance in a vehicle; 2) ease of storage; and 3) ease of conveyance to a desired location before an assembly procedure commences.

As noted in the collapsed condition, the basic support frame assembly 16 is operable to receive, support, and anchor folded ones of the handle support assemblies 18 thereagainst. Further, the wheel support assemblies 90 are folded inwardly after the support wheel assembly 92 and interconnected wheel support and protector assembly 94 have been removed.

Figure 10:
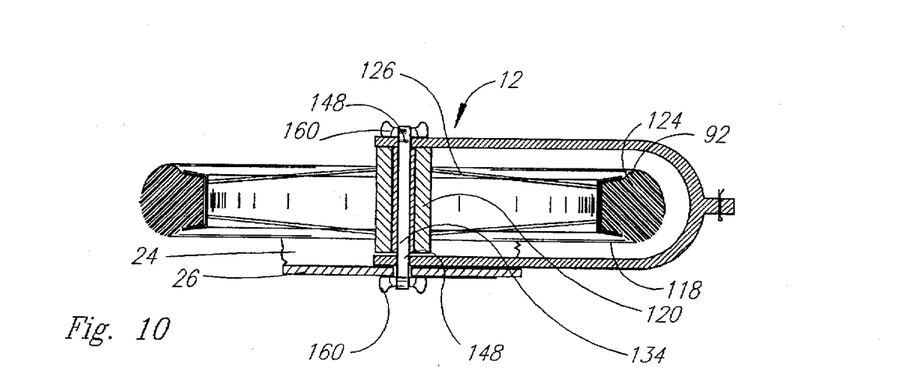
FIG. 10 is an enlarged fragmentary sectional view taken along line 10—10 in FIG. 9.

As noted in FIG. 10 in the collapsed condition, one end of the wheel axle member 134 has been inserted within an outer one of the central connector holes 46. A wing nut member 160 is threaded onto the one end of the wheel axle member 134 extended through the subject connector hole 46 to secure against the main load support plate 26 as also shown in FIG. 9.

It is obvious that the wheel support and protector assembly 94 could be anchored in the collapsed condition by use of any of the central connector holes 46 in the respective indentation sections 42 in the main load support plate 26.

On release of the basic support frame assembly 16 from the folded or collapsed condition, the wing nut member 160 is first removed from the anchored end of the wheel axle member 134. Next, the support wheel assembly 92 and interconnected wheel support and protector assembly 94 are removed from the basic support frame assembly 16.

On proceeding, the respective connector members 68 mounted through the collapsed handle connector holes 32 and the outer connector holes 88 in the connector link members 58 are removed. This allows the respective support arm assemblies 54 to be pivoted outwardly to 1) a support table condition as shown in FIG. 2; or 2) a game transport condition as shown in FIG. 1.

Figure 2:
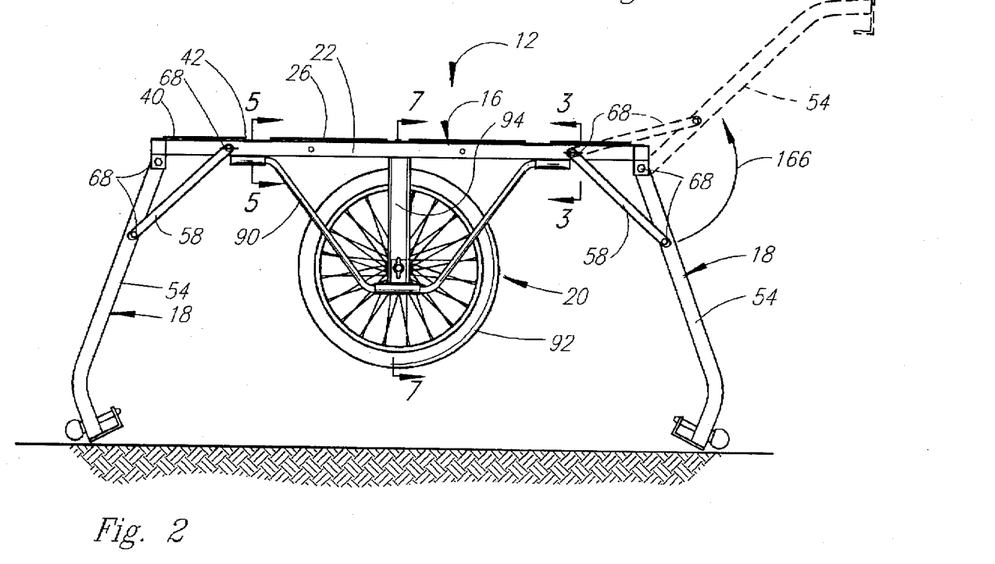
FIG. 2 is a side elevational view thereof assembled in a support table condition.

Assuming that an adjacent animal carcass 15 needs to be dressed, the users or hunters will move the support arm assemblies 54 (acting table legs) to the position of FIG. 2. In this position, the respective connector members 68 will be inserted and anchored into aligned ones of the outer connector holes 88 and the handle connector holes 30 in the outer side support members 22 (FIG. 2).

At this time as noted in FIG. 2, the wheel support struts 96 can be pivoted outwardly and interconnected to the support wheel assembly 92 and the wheel support and protector assembly 94 has been anchored to the respective wheel support brackets 115 (FIG. 7). The lug member 140 has been inserted through a central one of the connector holes 46 and held therein against axial movement by the cotter pin member 144.

The foldable load conveyance apparatus 12, as noted in FIG. 2, can be used as a conventional support table for a plurality of different uses including dressing of the carcass 15.

After the animal carcass 15 has been dressed, if used for this purpose, the connector link members 58 are released from connection to the basic support frame assembly 16 and the support arm assemblies 54 are pivoted outwardly as noted in dotted lines and indicated by an arrow 166 in FIG. 2. At this time, the respective connector members 68 have been removed, replaced, and anchored in the outer connector holes 88 of the connector link members 58 and the handle connector holes 30 in the outer side support members 22 to achieve the support and transport condition as shown in FIG. 1.

It is noted that the user can utilize the foldable load conveyance apparatus 12 without use of a second handle support assembly 18. If two users are available, it would be advisable to use both of the handle support assemblies 18 for greater control and stability, especially in carrying a heavy animal carcass 15 over rough terrain.

Normal use would be that the users, who may be big game hunters, could assemble the foldable load conveyance apparatus 12 at the point of their vehicle or, if in the collapsed condition, it can be easily carried to, or close to, a hunting site and later assembled and transported to the site of a fallen animal carcass 15 for loading thereon.

In loading of the animal carcass 15, it is to be noted that the foldable load conveyance apparatus 12, having a single handle support assembly 18, can be tilted upwardly about the support wheel assembly 92 for ease of pulling an animal carcass 15 onto the basic support frame assembly 16.

Further, it is obvious that the foldable load conveyance apparatus 12 can be tilted on one side which will be at an angle and the animal carcass 15 can then be slid onto the basic support frame assembly 16.

The user (or users) thereof would then grasp respective ones of the handle grip tube sections 64 for ease of movement and stabilizing the conveyance of the animal carcass 15 to a nearby ATV for conveyance to the user's highway transporting vehicle.

On reaching the ATV, it is noted that the ATV connector member 78 can be attached to a conventionally available rear support shaft member 162 of the ATV and secured thereon by dropping the anchor pin member 84 through the connector holes 80 in the outer end portion 76 of the handle grip tube section 64 and the anchor hole 82 in the ATV connector member 78.

The ATV would then be used to pull the foldable load conveyance apparatus 12, having the normally heavy animal carcass 15 thereon, to the transporting vehicle. At this time, the animal carcass 15 may be placed within the transporting vehicle.

The user may wish to dress the animal carcass 15 on reaching the transporting vehicle. Now, the respective support arm assemblies 54 are pivoted downwardly and locked in a support table condition as noted in FIG. 2 for dressing the animal carcass 15.

After dressing the carcass 15, the user would proceed with disassembly of the foldable load conveyance apparatus 12 being a reverse process of the previously described assembly operation from the folded or collapsed condition as noted in FIG. 9. The support wheel assembly 92 is removed and the wheel support assemblies 90 are folded inwardly. The handle support assemblies 18 are pivoted inwardly to be placed and locked against the basic support frame assembly 16 by the connector link members 58. Next, the wheel support and protector assembly 94 is secured against the main load support plate 26 of the basic support frame assembly 16 as shown in FIG. 9.

The foldable load conveyance apparatus 12 has been described as normally used by game hunters in remote locations in order to remove a heavy animal carcass 15 over normally rugged mountain terrain. It is obvious that the foldable load conveyance apparatus 12 can be used to convey other items to and from remote locations such as an injured hunter, camping supplies, and the like.

The novelty in the foldable load conveyance apparatus 12 lies in its ease of assembly and disassembly and placed in 1) a folded or collapsed position for ease of transporting and storage; and 2) a support table condition for a multiple of obvious uses.

The foldable load conveyance apparatus 12 is provided with a single wheel which is desirable when moving through thick brush and on narrow trails normally found in rugged terrain areas.

The spacing of the handle grip tube sections 64 of each handle support assembly 18 allows substantial control by the user thereof while being balanced on the single support wheel assembly 92.

In FIG. 10, it is noted that the tire member is of a solid rubber construction so that puncturing will not affect use in rugged mountain terrain where tire repair would be difficult.

The foldable load conveyance apparatus of this invention is easy to assemble and disassemble; operable to support and maintain a substantial load thereon; operable to function as a support table; easily controlled by one or a pair of users for moving on a narrow trail and through rugged terrain; easy to control during movement; sturdy in construction; and substantially maintenance free.

While the invention has been described in conjunction with preferred specific embodiments thereof, it will be understood that this description is intended to illustrate and not to limit the scope of the invention, which is defined by the following claims:

We claim:

1. A foldable load conveyance apparatus operable to support and move a heavy load over rugged terrain, comprising:

a) a basic support frame assembly having a load bearing surface;

b) a handle support assembly connected to a portion of said basic support frame assembly;

c) said handle support assembly includes spaced support arm assemblies, each having a handle grip tube section extended upwardly and generally parallel to said basic support frame assembly for ease of control and movement thereof;

d) a collapsible support wheel assembly including a wheel support assembly releasably connected to said basic support frame assembly and a support wheel assembly connected to said wheel support assembly;

e) said support wheel assembly engagable with a support surface;

f) each of said support arm assemblies having a frame connector section pivotally connected with a respective said portion of said basic support frame assembly; and g) said frame connector section selectively pivoted and locked by a connector link member in 1) a collapsed, storage, transport condition; 2) an assembled support table condition; and 3) an assembled load transport condition;

h) each of said handle grip sections having an outer end portion with an all terrain vehicle connector member mounted therein; and i) said all terrain vehicle connector member of L-shape operable to be gasped by a user thereof to pull up an recline and restrain movement on moving down an incline;

whereby said support wheel assembly in conjunction with said handle grip tube sections achieves controlled movement of said foldable load conveyance apparatus over narrow paths and rugged terrain.

2. A foldable load conveyance apparatus operable to support and move a heavy load over rugged terrain, comprising:

a) a basic support frame assembly having a load bearing surface;

b) a handle support assembly connected to a portion of said basic support frame assembly;

c) said handle support assembly includes spaced support arm assemblies, each having a handle grip tube section extended upwardly and generally parallel to said basic support frame assembly for ease of control and movement thereof;

d) a collapsible support wheel assembly including a wheel support assembly releasably connected to said basic support frame assembly and a support wheel assembly connected to said wheel support assembly;

e) said support wheel assembly engagable with a support surface;

f) each of said support wheel assemblies having a frame connector section pivotally connected with a respective said portion of said basic support frame assembly;

g) said frame connector section selectively pivoted and locked by a connector link member in 1) a collapsed, storage, transport condition; 2) an assembled support table condition; and 3) an assembled load transport condition;

h) said basic support frame assembly includes parallel outer side support members and end support members connected between respective outer spaced ends of said side support members; and a main load support plate secured to and extended between said side support members and said end support members; and i) said main load support plate constructed of a rigid metal material extended across an upper surface in a common plane of said side support members and said end support members and having a plurality of spaced reinforcement openings to add rigidity and load carrying strength thereto;

whereby said support wheel assembly in conjunction with said handle grip tube sections achieves controlled movement of said foldable load conveyance apparatus over narrow paths and rugged terrain.

3. A foldable load conveyance apparatus operable to support and move a heavy, load over rugged terrain, comprising:

a) a basic support frame assembly having a load bearing surface;

b) a handle support assembly connected to a portion of said basic support frame assembly;

c) said handle support assembly includes spaced support arm assemblies, each having a handle flip tube section extended upwardly and generally parallel to said basic support frame assembly for ease of control and movement thereof;

d) a collapsible support wheel assembly including a wheel support assembly releasably connected to said basic support frame assembly and a support wheel assembly connected to said wheel support assembly;

e) said support wheel assembly engagable with a support surface;

f) each of said support arm assemblies having a frame connector section pivotally connected with a respective said portion of said basic support frame assembly;

g) said frame connector section selectively pivoted and locked by a connector link member in 1) a collapsed, storage, transport condition; 2) an assembled support table condition; and 3) an assembled load transport condition;

h) said wheel support assembly includes a pair of spaced wheel support struts, each having a mid wheel support section connected to said support wheel assembly;

i) said wheel support assembly includes a wheel support bracket connected to respective ones of said mid wheel support sections;

j) said support wheel assembly includes a tire member which is connected to a wheel axle member which is connected to said wheel support bracket; and k) said wheel support strut having an outer connector section pivotally connected to said basic support frame assembly for selective movement from 1) a collapsed condition against said basic support frame assembly and 2) an extended position in a conveyance condition or a support table condition; and l) said tire member releasably connected against said basic support frame assembly to anchor folded ones of said wheel support struts in the collapsed condition;

whereby said support wheel assembly in conjunction with said handle grip tube sections achieves a controlled movement of said foldable load conveyance apparatus over narrow paths and rugged terrain.

4. A foldable load conveyance apparatus primarily designed for use by hunters to remove an animal carcass from a remote rugged terrain used for hunting, comprising:

a) a basic support frame assembly;

b) a handle support assembly connected to said basic support frame assembly;

c) a collapsible support wheel assembly connected to said basic support frame assembly;

d) said collapsible support wheel assembly includes a pair of wheel support assemblies connected at upper ends to said basic support frame assembly and a support wheel assembly rotatably connected to adjacent lower ends of said wheel support assemblies;

e) said support wheel assembly engagable with a ground surface for ease of guidance, control, and movement of said foldable load conveyance apparatus;

f) said handle support assembly includes a connector member releasably connected to said basic support frame assembly to secure said handle support assembly selectively in a first load conveyance condition; in a second support table condition; and in a third collapsed storage and transport condition;

g) said basic support frame assembly having 1) outer side support members; 2) end support members interconnected said side support members; 3) a main load support plate secured to said side support members and said end support members to provide a support surface; and 4) handle connector lugs secured to respective outer ends of said side support members;

h) said handle support assembly pivotally connected to said connector lugs operable to be selectively movable and locked by said connector member from 1) said first load conveyance condition; 2) said second support table condition; and 3) said third collapsed storage and transport condition; and i) said main load support plate constructed of a rigid metal material and having a plurality of spaced reinforcement openings to add rigidity and load carrying strength thereto.

5. A foldable load conveyance apparatus as described in claim 4, wherein:

a) said side support members and said end support members constructed of a tubular material for strength and lightweight;

b) each of said wheel support assemblies includes a wheel strut having a mid wheel support section and an outer pivot connector section pivotally connected to said basic support frame assembly;

c) each of said wheel support assemblies includes a wheel support bracket secured to said mid support section;

d) each of said wheel support brackets has a support tube section integral with a wheel support section;

e) said support tube section pivotally connected to said mid wheel support section and said wheel support section is connected to said support wheel assembly; and f) said wheel struts foldable to a position against said main load support plate with said support wheel assembly mounted against said wheel struts to hold in said third collapsed storage and transport condition.

6. A foldable load conveyance apparatus as described in claim 5, wherein:

a) said handle support assembly pivotal to a position against said support wheel assembly and secured by said connector member in said third collapsed storage and transport condition.

7. A foldable load conveyance apparatus operable to support and convey a load thereon, comprising:

a) a basic support frame assembly operable to receive, support, and convey the load thereon;

b) a handle support assembly pivotally connected to said basic support frame assembly and held in a preselected position by a connector link member;

c) a collapsible support wheel assembly connected to said basic support frame assembly;

d) said handle support assembly selectively movable and anchored in a selective position by said connector link member from 1) a first position extended upwardly and laterally of said basic support frame assembly in a load conveyance condition; 2) a second position extended below and laterally of said basic support frame assembly in a support table condition; and 3) a third position extended inwardly and against said basic support frame assembly in a collapsed storage and transport condition;

e) said collapsible support wheel assembly selectively movable from 1) a first assembled usage condition to support said basic support frame assembly in a load conveyance condition to convey the load thereon; and 2) to a disassembled condition anchored against said basic support frame assembly in the collapsed storage and transport condition; and f) said collapsible support wheel assembly includes a pair of wheel support shuts pivotally connected to said basic support frame assembly and having a support wheel assembly rotatably connected to adjacent outer ends of said wheel support struts; and g) said wheel support struts foldable inwardly to cover each other in the collapsed storage and transport condition with said support wheel assembly mounted against said wheel support struts and held thereagainst by said handle support assembly being folded thereagainst.

8. A foldable load conveyance apparatus operable to support and convey a load thereon, comprising:

a) a basic support frame assembly operable to receive, support, and convey the load thereon;

b) a handle support assembly connected to said basic support frame assembly;

c) a collapsible support wheel assembly connected to said basic support frame assembly;

d) said handle support assembly selectively movable from 1) a first position extended upwardly and laterally of said basic support frame assembly in a load conveyance condition; 2) a second position extended below and laterally of said basic support frame assembly in a-support table condition; and 3) a third position extended inwardly and against said basic support frame assembly in a collapsed storage and transport condition; and e) said handle support assembly includes connector link members releasably connected to said basic support frame assembly to secure said handle support assembly in said first position, said second position, and said third position.

9. A foldable load conveyance apparatus as described in claim 8, wherein:

a) said handle support assembly includes a connector member of L-shape operable to restrain and control movement of said basic support frame assembly both downwardly and upwardly on an inclined terrain; and b) said connector member selectively connected to a portion of a transport vehicle for aid in moving said foldable load conveyance apparatus to a desired location.

\* \* \* \* \*